Aug. 21, 1928.
L. F. LOSI
1,681,354
BRAKE MECHANISM
Filed April 21, 1926
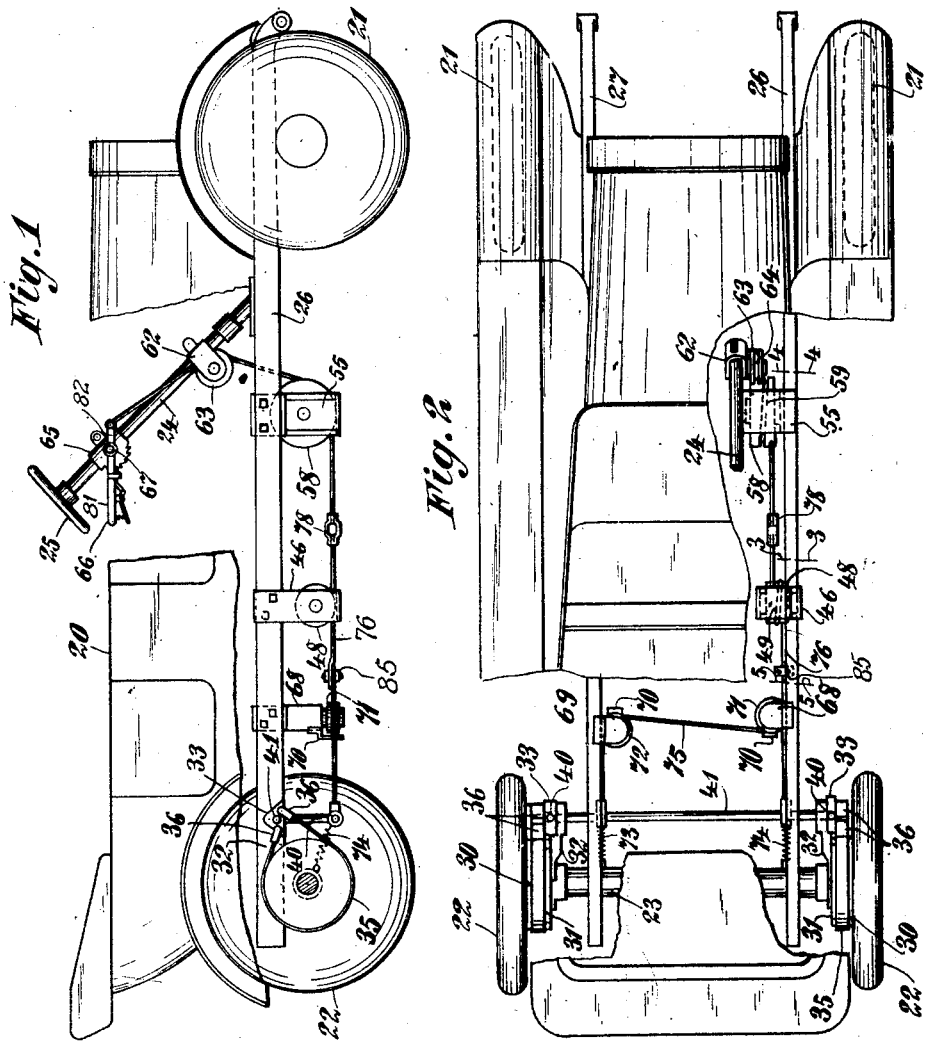
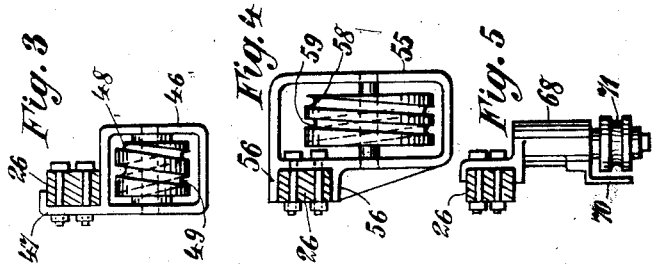
INVENTOR:
Lee Francisco Losi.
BY
ATTORNEY.

Patented Aug. 21, 1928.

1,681,354

UNITED STATES PATENT OFFICE.

LEE FRANCISCO LOSI, OF NEWARK, NEW JERSEY, ASSIGNOR OF ONE-FIFTH TO MICHAEL MERCOLINO, ONE-FIFTH TO PASQUALE FUOCO, ONE-FIFTH TO PETER PARIS, AND ONE-FIFTH TO GENNARO LARDONE, ALL OF BAYONNE, NEW JERSEY.

BRAKE MECHANISM.

Application filed April 21, 1926. Serial No. 103,509.

This invention relates to a brake mechanism.

The object of the invention is the production of a mechanism, by means of which the strap of a brake, with its lining, can be easily and with little effort positioned to bear against its disc. The second object of the invention is the production of a brake mechanism operated by an operating handle having unequal arms, whereby the force exerted by the operator is converted into a greater force transmitted to the brakes of the mechanism. The third object of the invention is the production of a brake mechanism which is operated within easy reach of the operator.

In the accompanying drawings Fig. 1 represents a side elevation of an exemplification of the brake mechanism applied to an automobile; Fig. 2 shows a top plan view of Fig. 1; Fig. 3 indicates an enlarged section of Fig. 2 on the line 3, 3; Fig. 4 is an enlarged section of Fig. 2 on the line 4, 4 and Fig. 5 represents an enlarged section of Fig. 2 on the line 5, 5.

An automobile is indicated in its entirety by the numeral 20, and is shown with the front wheels 21, the rear wheels 22, the rear axle sleeve 23, the steering post sleeve 24, the steering wheel 25 and the longitudinal frame members 26 and 27.

To the wheels 22 are fastened the usual annular brake bodies 30, with their usual stationary end disc plates 31, which latter are supported by the rear axle sleeve 23. The usual journal brackets 32 extend from the plates 31 and have pivoted thereto the usual triangular shaped levers 33. The brake straps 35 with their usual liners, encircle the brake bodies 30 and have their ends connected to the arms 36, which latter are pinned to the levers 33 in the usual way. An arm 40 extends from each of the levers 33 and a rod 41 connects the latter arms.

A rectangular shaped journal bracket 46 has formed therewith the flange 47, which latter is fastened to the frame member 26. A roller 48 with a helical circumferential guide groove 49 is journalled in the bracket 46. A second similar rectangular shaped journal bracket 55 with the flanges 56 is also fastened to the frame member 26. A roller 58 larger in diameter than the roller 48 having the helical circumferential guide groove 59 is journaled in the journal bracket 55. The roller 58 in this instance is twice the diameter of the roller 48.

A bracket 62 is clamped to the steering post sleeve 24 and has journaled thereto the the guide sheave 63 having the guide groove 64. A ratchet sector 65 is fastened to the steering post sleeve 24 and has pivoted thereto the operating handle 66, by means of the pivot 67, which divides the handle into a lever having the long arm 81 and short arm 82. The handle is provided with the usual latch to lock it to the sector 65.

A pair of similar brackets 68 and 69 are respectively fastened to the frame members 26 and 27, and are each provided with a guard 70. Guide sheaves 71 and 72 are pivoted to the brackets 68 and 69.

Helical springs 73 and 74 have respectively one end each fastened to one of the arms 40 and their other ends extend to the axle sleeve 23. The cable 75 engages the sheaves 72 and then connects with the cable 76 which engages the sheave 71. The connection between the cables 75 and 76 is made with the usual cable clamp 85. The cable 76 then engages the helical circumferential groove 49 of the roller 48, and then engages the helical circumferential groove 59 of the roller 58. Next the cable 76 engages the groove 64 of the sheave 63, and then extends to the short arm of the operating handle 66. A turnbuckle 78 is connected to the cable 76 to maintain it taut.

To set the brakes having the straps 35 the operator bears on the operating handle 66 and thereby the cable 75 is pulled in the direction of the arrow A and the cable 76 in the direction of the arrow B. By this means the brake straps 35 are made to hug their brake bodies. The operating handle 66 having arms of unequal length, whereby, with a slight effort by the operator on said handle 66, a substantial pull is exerted on the cables 75 and 76 to set the brakes.

The present exemplification of the invention is to be taken as only illustrative and not limitative thereof.

Having described my invention what I desire to secure by Letters Patent and claim is:

1. The combination in a vehicle of a pair of brake bodies for an axle thereof, a brake strap for each of said brake bodies, an operating handle in connection with the steering post of the vehicle, a pair of journal brackets fastened to one of the frame members of the vehicle, a roller having a helical circumferential groove journaled in one of said journal brackets, a roller larger in diameter than the first one journaled in the second journal bracket, a journal bracket fastened to said frame member, a guide sheave journaled to the latter journal bracket, a second journal bracket fastened to the other frame member of the vehicle, a guide sheave journaled to the latter journal bracket, a cable with one end extending from said operating handle and winding around the roller having the larger diameter, then leading to and winding around the other roller and then in connection with one of said brake straps, and a second cable with one end in connection with the second brake strap then engaging the sheave journaled to the journal bracket of the second frame member, said second cable then leading to the first guide sheave and connected to the first cable.

2. The combination in a vehicle of a brake body for an axle thereof, a brake strap for said brake body, an element pivoted to the vehicle with the ends of the brake strap connected thereto, one arm extending from said element, an operating handle in connection with the steering post sleeve of the vehicle, a pair of rollers one larger in diameter than the other and each having a helical circumferential guide groove journaled in the vehicle, a spring with one end thereof connected to said arm and a cable with one end connected to said arm then leading over the small roller, next leading over the large roller and connected to said operating handle.

In testimony whereof I affix my signature.

LEE FRANCISCO LOSI.